United States Patent [19]

Husted

[11] Patent Number: 4,878,298

[45] Date of Patent: Nov. 7, 1989

[54] LIQUID INDICATOR GAUGE

[76] Inventor: Royce H. Husted, 711 Lakeside Dr., Wheaton, Ill. 60187

[21] Appl. No.: 265,399

[22] Filed: Oct. 31, 1988

[51] Int. Cl.$^4$ .............................................. G01B 13/02
[52] U.S. Cl. ...................................... 33/837; 33/644
[58] Field of Search ................ 33/147 C, 172 C, 837, 33/644, 642, 638, 632; 73/747, 748, 749

[56] References Cited

U.S. PATENT DOCUMENTS 1,245,559  11/1917  Booth ................................ 33/147 C
2,239,573  4/1941  Roberts ............................. 33/172 C

FOREIGN PATENT DOCUMENTS 912130  4/1946  France .............................. 33/172 C
567949  9/1977  U.S.S.R. ............................ 33/172 C

*Primary Examiner*—Harry N. Haroian
*Attorney, Agent, or Firm*—Nicholas A. Camasto

[57] ABSTRACT

A circular indicator gauge includes a body of molded plastic and a spiral channel formed therein with an inlet at one end of the channel and an air filled reservoir at the other end. A movable piston is in a chamber that is filled with mercury and in communication with the inlet of the channel. A faceplate and indicia film are ultrasonically welded to the body to complete the channel and reservoir. A spring in the chamber urges the piston toward a rest position. A sensing device moves the piston in response to displacement of a workpiece. A compensating screw communicates with the chamber for correcting for temperature changes. A cylindrical, relative displacement indicator is also disclosed and includes a clear body with a straight channel therethrough that is in communication with a piston that is movable in a mercury filled chamber and is operated by a sensor. An upper cap enables in line mounting of the indicator in the chuck of a tool, such as a drill press.

10 Claims, 2 Drawing Sheets

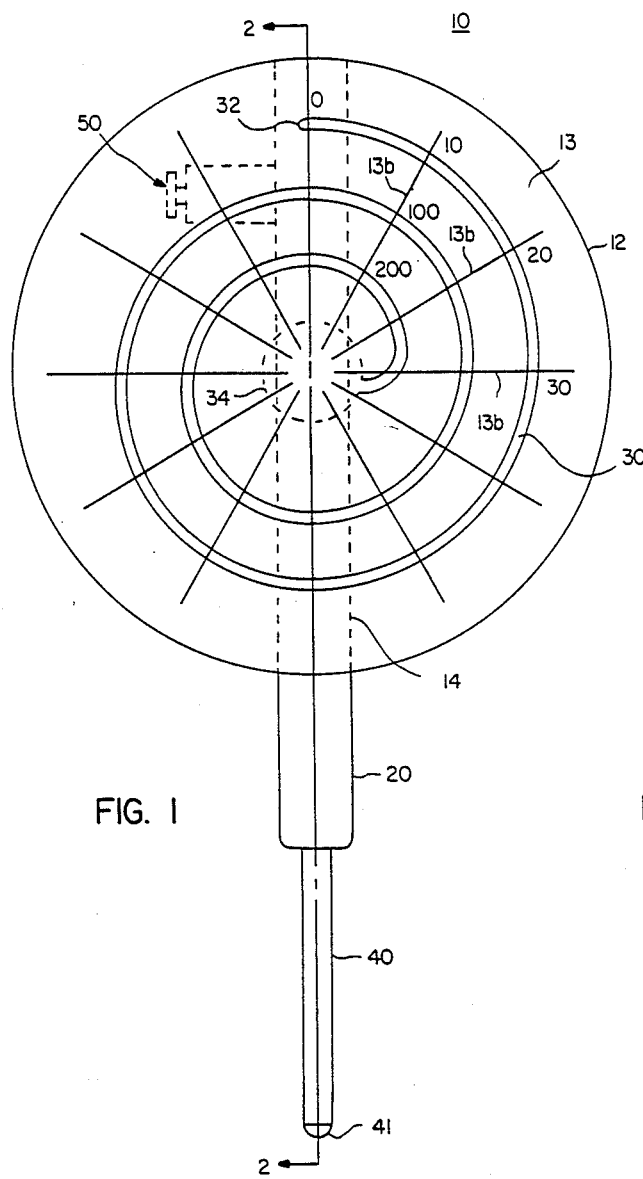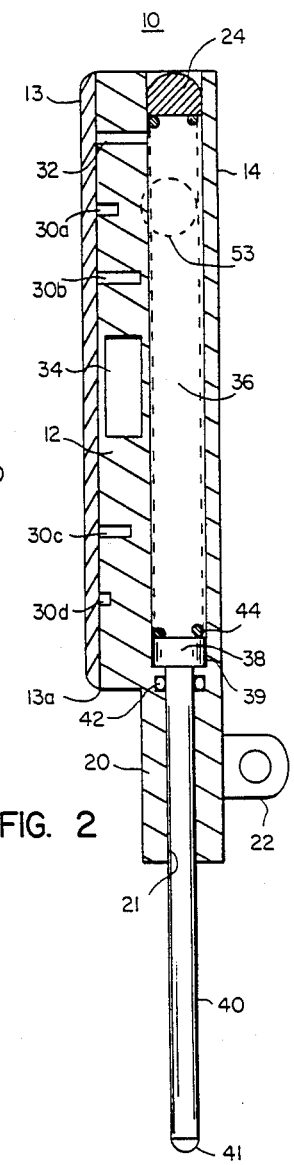
FIG. 1
FIG. 2
FIG. 3

LIQUID INDICATOR GAUGE

BACKGROUND OF THE INVENTION AND PRIOR ART

This invention relates to precision indicator gauges utilized in machine shops and the like. So-called dial indicator gauges are well known in the art for measuring displacement, that is, the distance that a workpiece (or the like) moves with respect to a given point. The gauges are delicate and include many intricate parts that are carefully assembled and adjusted. They are also used in conjunction with suitable attachments for enabling machinists to precisely center a drill press or mill with respect to a circular hole in a workpiece. The dial indicator, when used as a test indicator to show relative movement, is coupled by means of a mechanical linkage arrangement to the tool chuck and adjusted such that the sensing foot of the indicator engages the periphery of the hole in the workpiece that is to be centered. The machinist manually rotates the tool spindle a small amount and notes any deflection of the indicator needle. He then determines an approximate correction to be made to the workpiece supporting table to bring the hole closer to the center of the spindle. After the adjustment is made, the spindle is again rotated slightly while the needle of the test indicator gauge is observed. Further adjustments are made to bring the center of the hole in the workpiece on center with the tool spindle. When the test indicator needle shows substantially zero deflection as the spindle is rotated through 360°, the machinist is assured that the spindle is centered with respect to the hole in the workpiece. This is a somewhat tedious trial and error method that requires the machinist to observe the indicator needle movement (or lack thereof) in a number of circumferential orientations. Since the gauge rotates with the spindle, the machinist must crane his neck into very awkward positions to observe the needle. Needless to say, the technique is very time consuming. While the test indicator in the above illustration is a precision device, it is used only to indicate movement and not to measure the amount of movement.

As mentioned, dial indicators are precision instruments and are therefore somewhat delicate. During normal machine shop use, the indicators are often subjected to inadvertent rough handling and it is quite common to require periodic recalibration and replacement of broken parts to restore them to proper operation. In addition to the high initial cost of the dial indicator, repair or reconstruction costs are also high. It would be of great benefit to a machinist to have a low cost and an accurate indicator gauge that is ruggedly built to withstand use in a machine shop environment. It would also be a boon to a machinist to have an indicator gauge that could be used to simply and effectively determine when the spindle of a rotary tool is centered with respect to a circular hole in a workpiece.

The indicator gauges of the present invention use an incompressible liquid, such as mercury, to measure movement by displacement of the liquid in a closed tube or channel, preferably formed in a molded gauge body. The position of the liquid in the channel is determined by movement of a piston that in turn is driven by movement of a sensing device that contacts the workpiece. The body of the indicator is preferably fabricated of clear plastic material with the surface in which the channel is formed being of a contrasting color to enhance the visibility of the liquid, which is preferably mercury. A circular version of the liquid indicator of the invention, with a spiral groove in its face, and a cylindrical straight line version are disclosed. The liquid gauges constructed in accordance with the invention are accurate, low cost, simple to manufacture and use, and are extremely rugged.

OBJECTS OF THE INVENTION

A principal object of the invention is to provide a novel gauge for measuring movement.

Another object of the invention is to provide a rugged, reliable and accurate machinist gauge.

A further object of the invention is to provide an accurate machinist gauge that is simple to use.

BRIEF DESCRIPTION OF THE DRAWINGS

These and other objects and advantages of the invention will be apparent upon reading the following description in conjunction with the drawings in which:

FIG. 1 is a front view of a circular indicator gauge constructed in accordance with the invention;

FIG. 2 is a sectional view of the indicator gauge of FIG. 1 taken along the line 2—2;

FIG. 3 is a bottom view of the indicator gauge of FIG. 1;

DESCRIPTION OF THE PREFERRED EMBODIMENT

Figure 4:
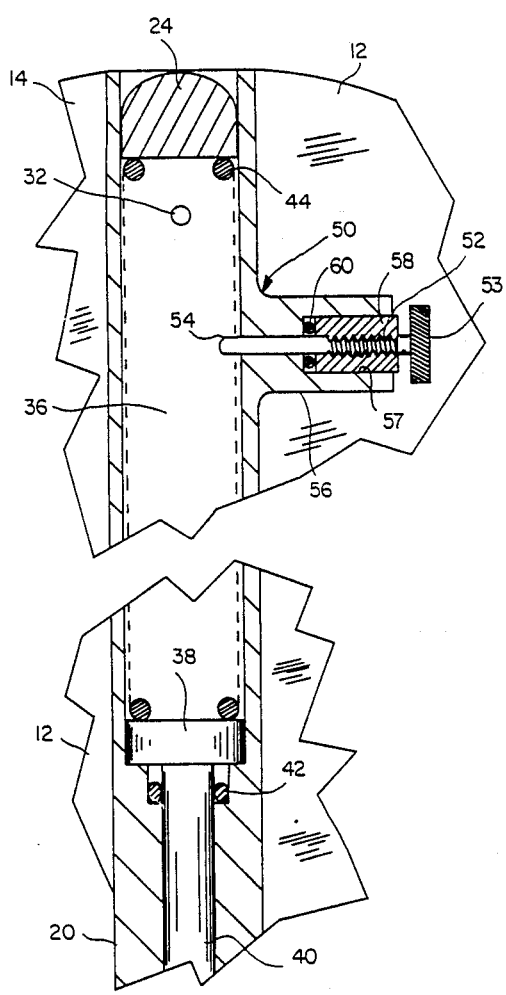
FIG. 4 is an enlarged sectional, partial rear elevation of the indicator gauge of FIG. 1 showing a compensation mechanism.

Referring to FIG. 1, a circular indicator gauge constructed in accordance with the invention is generally described by reference numeral 10. Gauge 10 has a generally circular body 12 that includes a clear faceplate 13. Body 12 has a generally cylindrical portion 14, extending from its rear surface, that protrudes below body 13 in an extension 20. As best seen in FIG. 2, cylindrical portion 14 forms a cylindrical chamber 36 that extends over the diameter of body 12 and is capped at one end by a closure 24 and contains a movable piston 38 at the other end. Piston 38 includes a shaft 40 that passes through a cylindrical aperture 21, of substantially the same diameter as shaft 40, in extension 20. A liquid seal is formed between cylindrical portion 14, aperture 21 and shaft 42 by an O-ring 42, or the like. For a very low friction seal between shaft 40 and aperture 21 in extension 20, a conventional lip seal device may be used in place of O-ring 42. The end of shaft 40 includes a conventional removable sensing tip 41 for contacting a workpiece or the like. A return spring 44 is confined in cylindrical chamber 36 for exerting a return force on piston 38 to assure that it seats against a stop surface 39, formed in the bottom of cylindrical chamber 36, when no force is exerted at the bottom of sensing tip 41. A mounting means 22 is shown at the rear of extension 20 and may be used to secure gauge 10 in position with respect to a workpiece by suitable well known mechanical linkage (neither being shown).

A spiral channel 30 is formed in the front surface of body 12 and communicates with cylindrical chamber 36 by means of an inlet passage 32 formed in body 12 at the upper end of channel 30. The other, or far end, of channel 30 terminates in a generally circularly shaped reservoir cavity 34. Reservoir cavity 34 and channel 30 are sealed when faceplate 13 is affixed, and the air trapped in reservoir cavity 34 acts on the meniscus of the mercury column in the channel to keep the mercury from "breaking up". A simple manual compensation mechanism 50, best seen in FIGS. 3 and 4 is included for correcting for volume changes of the liquid with changes in temperature.

An indicia film 13a, carrying indicia marks 13b, is sandwiched between clear faceplate 13 and body 12 and the body faceplate and indicia film are preferably ultrasonically welded. The surface 31 in which channel 30 is cut is preferably treated to have a contrasting color so as to enhance the visibility of the mercury or other liquid in channel 30.

In operation, body 12, indicia film 13a and reservoir cavity 34. Cylindrical chamber 36 is filled with an incompressible liquid, preferably mercury, trapping air in reservoir cavity 34. This may be readily accomplished with a measured amount of liquid, which is readily determined from the volume of cylindrical chamber 36. A suitable plug mechanism 24 is inserted while the level of the liquid is observed. When the liquid just appears at passage 32, the plug is sealed in position. It will be appreciated that a threaded arrangement for plug 24 may be utilized for a more precise adjustment, should that be desired. It is also contemplated that other means for establishing the position or level of the liquid may also be used; e.g. an adjustable stop may be provided on shaft 40 for controlling the return position of piston 38. Similarly, compensation mechanism 50 may be designed with sufficient range to assist in "zeroing" of the gauge. The particular technique employed is not part of the invention.

The indicia marks 13b are radially disposed about spiral channel 30. The arc length of spiral channel 30 thus decreases at a non linear rate. To provide a uniform scale (marked by the radial indicia marks 13b), the channel depth increases along the spiral path. As is seen in FIG. 2, the depth of the channel 30 increases with the distance traversed along the spiral, i.e. from inlet passage 32 to reservoir cavity 34. Thus the cross section at 30d of spiral 30 is smaller than the cross section at 30a, which in turn is smaller than the cross section at 30c. The largest cross section is shown at 30b, near the reservoir end of spiral 30. Thus the position of the liquid, as viewed through the transparent faceplate 13, indicates linear displacement. Those skilled in the art will recognize that the formula for calculating the depth of the spiral groove relative to the position along the spiral groove is well known and relatively simple. It will also be appreciated that since the preferred embodiment contemplates a molded plastic body for the gauge, the spiral groove need only be machined for the mold cavity. Thereafter the gauge bodies with the spirals formed therein can be produced with a very high degree of precision. It will also be apparent that a linear scale may also be designed with suitable changes in the channel cross section.

Referring specifically to FIG. 4, compensation mechanism 50 is shown on the rear portion of body 12 positioned orthogonally to cylindrical portion 14. A compensation screw 52 includes a knurled head 53 and a cylindrical shaft extension 54 that protrudes into cylindrical chamber 36. A molded portion 56, orientated at right angles to cylindrical portion 14, includes an opening 55 through which extension 54 passes. A large diameter cylindrical hole 57 is formed in the end of portion 56. An O-ring 60 forms a liquid seal between shaft extension 54 and opening 55. An internally threaded insert 58 is secured within hole 57 by any conventional means and functions to secure O-ring 60 in place and receives compensation screw 52, which is threaded into insert 58.

The volume of liquid in cylindrical chamber 36 (and spiral 30) will vary slightly with atmospheric pressure changes. The compensation screw may be used to compensate for the volume change of the liquid to maintain the indicator gauge "zeroed". Obviously, the pressure compensation adjustment need not be made very often. The compensation mechanism may also be used to compensate for temperature changes, although the temperature in a machine shop will not vary appreciably. Also, as indicated above, compensation mechanism 50 can be designed to have sufficient range to aid in the initial filling and zeroing of the gauge.

Figure 5:
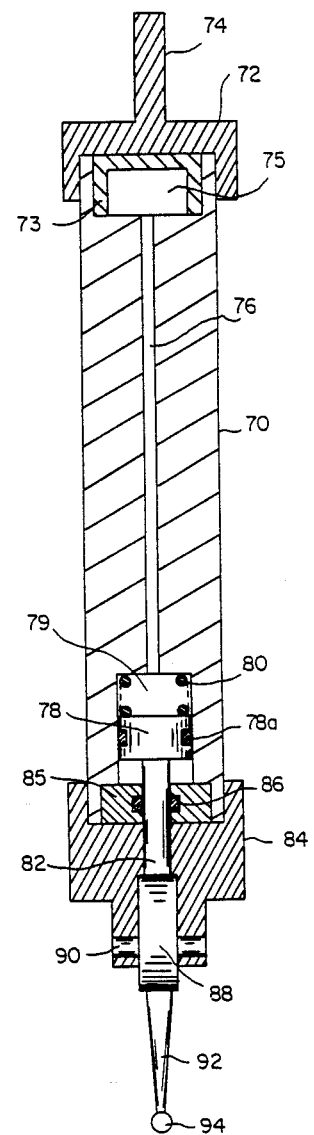
FIG. 5 is a partial sectional view of a cylindrical form of indicator gauge constructed in accordance with the invention.

Referring to FIG. 5, there is shown a cross sectional view of a cylindrical gauge constructed in accordance with the invention. Body 70 is tubular and includes a small, straight channel 76 therethrough. Body 70 is constructed of transparent material so that liquid in channel 76 is visible from any viewing angle. An upper cap 72 is fitted to the upper end of body 70 and includes a stem 74 that may be conveniently held in the chuck of a rotatable tool such as a drill press or a milling machine. A closure 73 is shown in place in an undercut portion of body 70 and forms an air reservoir chamber 75 in communication with the end of channel 76. Air reservoir chamber 75 provides a pressure cushion to keep the liquid in channel 76 together as the liquid is drawn back out of the channel after use, i.e. in response to removal of a force from a sensing tip 94.

A piston 78 having a shaft 82 is positioned in an enlarged cavity 79 in body 70 and the cavity 79 is filled with an incompressible liquid, preferably mercury. A spring 80 continually urges piston 78 against the surface of a bottom closure 85 that seals the lower end of body 70. O-ring 86 seals shaft 82, and an O-ring 78a seals piston 78 with respect to body 70. A lower cap 84 includes a pair of depending ears having a pin 90 fitted therethrough for affixing a camming piece 88, to which is attached a sensing stem 92 and sensing tip 94. These latter parts are very well known in the dial indicator gauge art and sensing stem 92 is frictionally adjustable with respect to camming piece 88 to enable sensing tip 94 to follow the inner contour of a circular hole in a workpiece.

With the cylindrical gauge embodiment of the invention, stem 74 is merely secured in a suitable chuck arrangement and the sensing tip 94 positioned to track the inner surface of a circular hole of the workpiece (not shown). As the tool spindle is rotated, the height of the liquid in channel 76 is clearly visible without the machinist moving his head, which readily facilitates making adjustments to the workpiece table to center the hole with the spindle. Indeed, the tool spindle may even be driven at low speed while the table adjustments are being made and with the operator merely watching the height of the column of liquid in channel tube 76 for movement. When the height of the liquid column remains stationary during rotation, the spindle of the tool is centered with the center of the hole in the workpiece.

It will be appreciated that other emboidments and uses for the liquid gauges of the invention may be devised by those skilled in the art without departing from the spirit and the scope of the invention. The invention is to be limited only as defined in the claims.

What is claimed is:

1. A measuring gauge comprising:
   a generally circular body;
   a spiral channel formed in said body and including an inlet at one end and a sealed reservoir at the other end;
   a compressible medium in said sealed reservoir for pressurizing said other end of said channel;
   said spiral channel increasing in cross sectional area from said inlet to said reservoir to provide a uniform radial scale of liquid movement in said spiral;
   a chamber communicating with said inlet;
   a piston movable in said chamber;
   a liquid in said chamber displaceable by said piston to flow in said channel; and
   a sensing device coupled to said piston for moving said piston responsive to displacement of said sensing device.

2. The gauge of claim 1, further including a spring for urging said piston to a return position in said chamber.

3. The gauge of claim 2 wherein said body is molded of plastic and further including a faceplate of clear plastic and an indicia film interposed between said body and said faceplate.

4. The gauge of claim 3, further including compensation means for compensating for changes in volumes of said liquid with changes in temperature.

5. The gauge of claim 4 wherein said liquid comprises mercury and wherein said reservoir contains air.

6. The gauge of claim 5, wherein said body, said faceplate and said indicia film are ultrasonically welded.

7. A visual indicator for positioning a workpiece with respect to a rotatable tool holder comprising:
   a cylindrical body of transparent material;
   means on said cylindrical body adapted to removably secure said cylindrical body to said tool holder and in axial alignment therewith;
   a channel axially extending through said cylindrical body;
   a chamber located at one end of said channel and a sealed reservoir located at the other end of said channel;
   a compressible medium in said reservoir for pressurizing said other end of said channel;
   a piston movably mounted in said chamber;
   a liquid in said chamber displaceable in said channel in response to movement of said piston, the height of said liquid in said channel being visible throughout a substantially 360° angle; and
   a sensor coupled to said piston for moving said piston responsive to displacement of said sensor by said workpiece.

8. The indicator of claim 7, further including a spring for urging said piston toward a rest position in said chamber.

9. The indicator of claim 8 wherein said liquid comprises mercury.

10. The indicator of claim 9 wherein said reservoir contains air and wherein said body, said chamber and said channel are hermetically sealed.

* * * * *

UNITED STATES PATENT AND TRADEMARK OFFICE
CERTIFICATE OF CORRECTION

PATENT NO. : 4,878,298
DATED : November 7, 1989
INVENTOR(S) : Royce H. Husted

It is certified that error appears in the above-identified patent and that said Letters Patent is hereby corrected as shown below:

Column 3, line 17, after "and", insert --faceplate 13 are assembled to form a closed channel 30 and--.

Signed and Sealed this

Twenty-third Day of October, 1990

Attest:

HARRY F. MANBECK, JR.

*Attesting Officer* — *Commissioner of Patents and Trademarks*